UNITED STATES PATENT OFFICE.

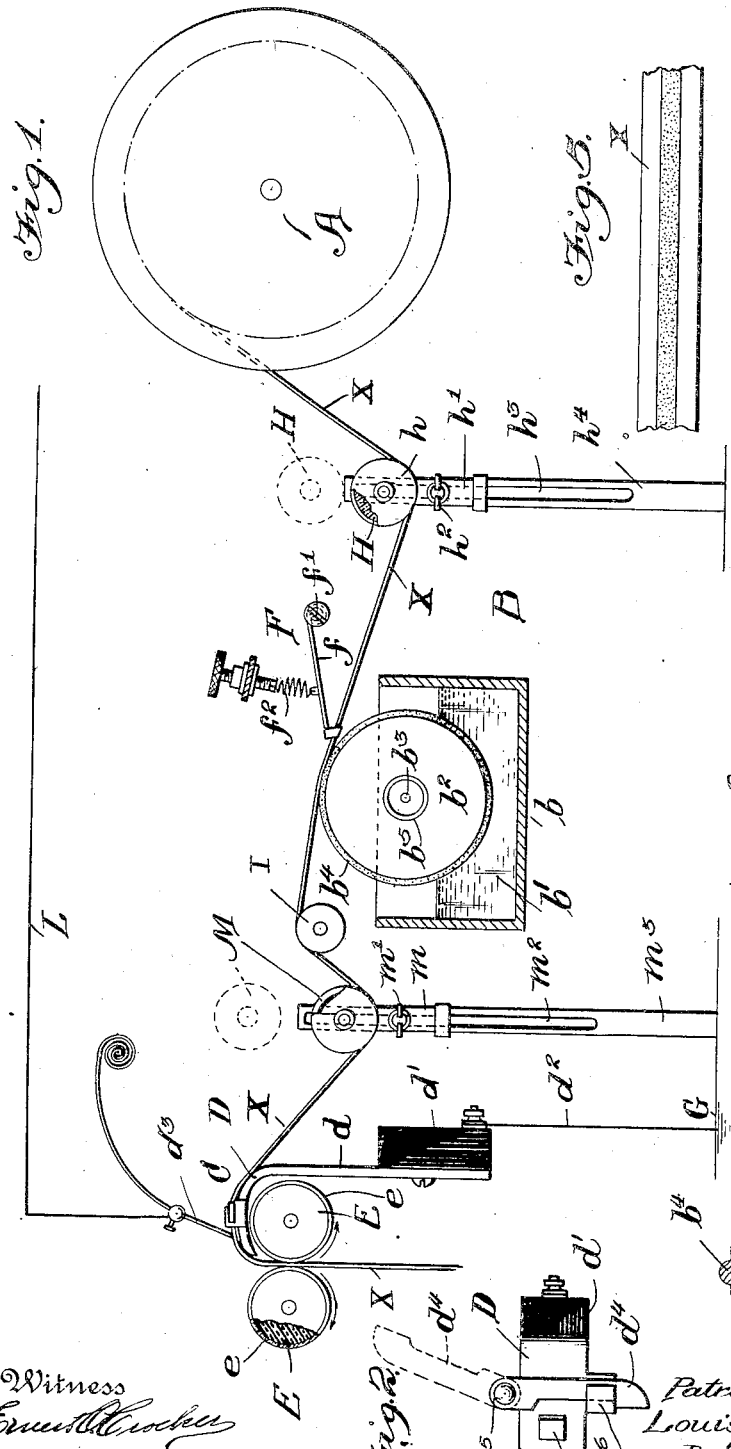

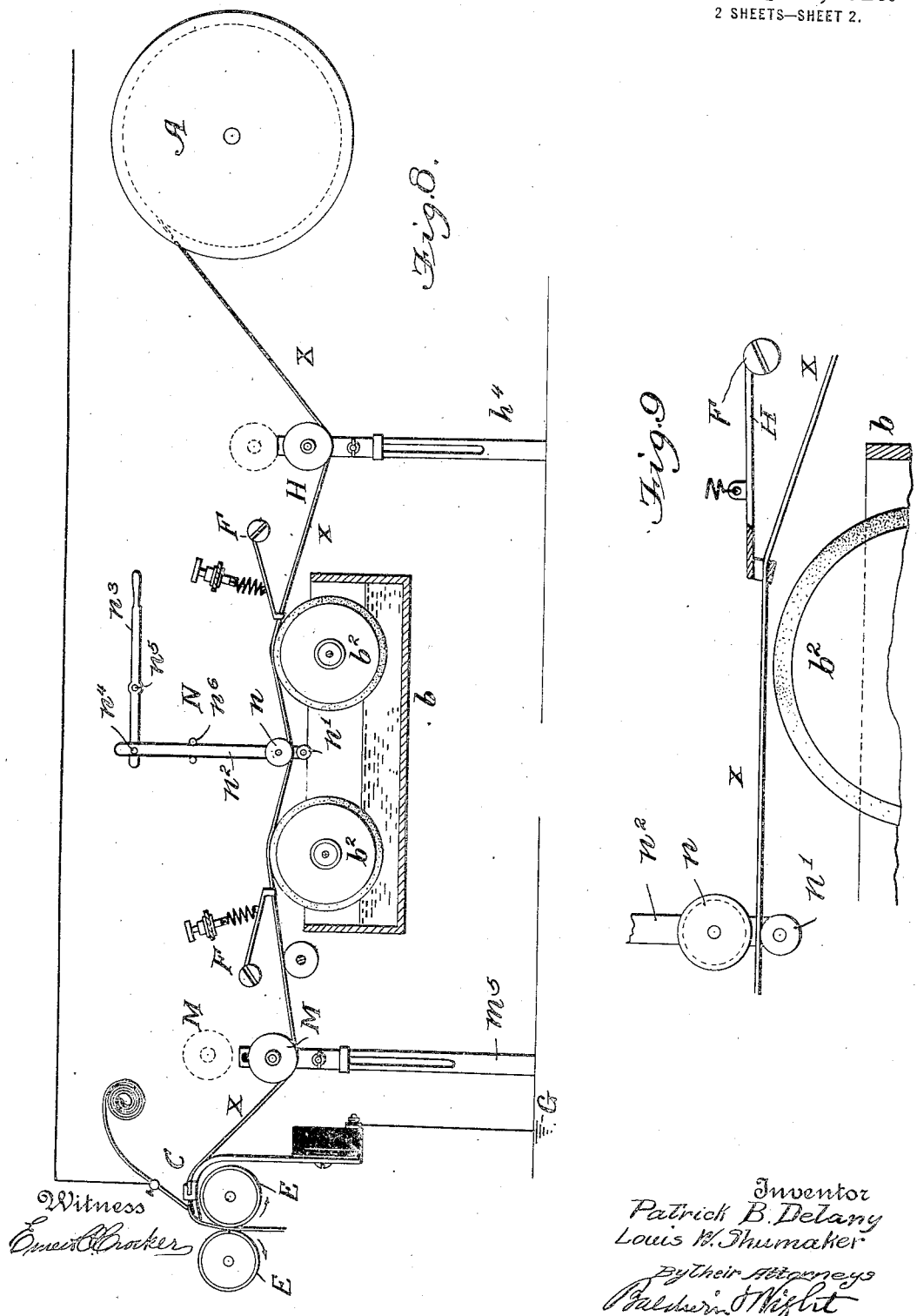

PATRICK B. DELANY, OF SOUTH ORANGE, NEW JERSEY, AND LOUIS W. SHUMAKER, OF NEW YORK, N. Y., ASSIGNORS TO TELEPOST COMPANY, OF NEW YORK, N. Y., A CORPORATION OF MAINE.

TELEGRAPHY.

1,350,790.　　　　Specification of Letters Patent.　　Patented Aug. 24, 1920.

Application filed June 12, 1918. Serial No. 239,575.

*To all whom it may concern:*

Be it known that we, PATRICK B. DELANY, of South Orange, in the county of Essex and State of New Jersey, and LOUIS W. SHUMAKER, of the city, county, and State of New York, both citizens of the United States, have invented certain new and useful Improvements in Telegraphy, of which the following is a specification.

This invention relates to chemical telegraphy wherein a chemically treated tape is passed at high speed between the specially constructed terminals of an electric circuit and receives a record of telegraphic characters produced by the action of the chemical solution in the tape on one of the terminals which is usually in the form of a pen, stylus or wire, and from which metal passes to the treated tape in order to produce plainly readable characters thereon.

In telegraphic apparatus of the kind referred to it is highly important that the tape should be moistened with the solution to such an extent only as to insure the recording of the characters on the tape without weakening it or wetting it to such an extent as to blur the record or produce imperfect or unintelligible marks, and it is also important that the record-receiving side of the tape should be free from foreign substances which would interfere with the proper action of the recording devices.

It has been quite common to first dip a roll of paper tape in a suitable chemical solution, then place it on a reel and then draw it through the recording devices, but in such cases the tape was often too dry or to wet causing an imperfect record to be received, sometimes to break, and at other times by reason of chemical crystals or other foreign matter present to receive inaccurate marks or characters.

The object of this invention is to provide an apparatus for use in electro-chemical telegraphy in which the tape in a dry condition is taken from a reel and supplied with the correct amount of chemical solution in a pure condition while passing from the reel to the recording devices.

In carrying out our invention we provide a container for the solution into which dips a wetting wheel over which the tape passes and which thus applies the solution to the under side of the tape. Means is provided for regulating the length of tape contacting with the wheel so that the correct amount of solution may be applied thereto in such manner that it will filter through the tape from its under to its upper side thus causing some of the surplus moisture to be absorbed and preventing the deposit of foreign substances on the record surface. Furthermore we cause the solution to be applied to the middle portion of the tape in such manner that the side portions or marginal portions of the tape will afford means for a lateral absorption of the solution and thus better prepare the treated tape for receiving the record. Provision is also made for holding the tape out of contact with the wetting wheel while the tape is at rest, and other devices are used for regulating the length of tape between the wetting wheel and the recording devices to accommodate different climatic conditions as experience has shown that the condition of the tape as regards moisture varies at different times and in different climates which may be corrected by regulating the length of moistened tape exposed to evaporation and absorption before reaching the record-applying devices.

In a modified form of the apparatus we employ a container for the chemical solution in which operates a plurality of wetting wheels spaced a suitable distance apart in such manner that the first wheel gives a preliminary application of the solution to the tape and thus prepares it to better receive a final application of the solution and we also provide means for increasing or decreasing the length of tape between the wheels, thus giving a proper amount of time for the solution received from the first wetting wheel to be absorbed by the tape before it comes in contact with the final wetting wheel.

In the accompanying drawings:

Figure 1 is a diagrammatic view of apparatus embodying our improvements.

Fig. 2 is a plan view of one of the contact devices over which the tape passes.

Fig. 3 is a detail view of said device.

Fig. 4 is a sectional view of the wetting wheel.

Fig. 5 is a plan view of a portion of the treated tape.

Fig. 6 illustrates the devices for holding the tape away from the wetting wheel when the tape is not being drawn through the apparatus.

Fig. 7 is a sectional view of one of the tape guides.

Fig. 8 is a view similar to Fig. 1 but showing how a plurality of wheels are made to operate in the container and how the length of the tape between the wheels may be increased or decreased.

Fig. 9 shows how the tape is withdrawn from a wetting wheel when released by the tape-feeding mechanism.

The tape X in a dry condition is placed on a reel A and led therefrom through suitable guides hereinafter described, past the solution-applying devices B to the recording devices C.

The solution-applying devices B comprise a container $b$ for the solution $b'$, and a wetting wheel $b^2$ revolving about a horizontal axis $b^3$. The wheel is provided on its periphery with a band of absorbent material $b^4$ which is moistened by the solution while the wheel is revolving therein. The wheel may be turned by hand when desired by means of a knob $b^5$. The recording devices shown comprise a contact plate D having a downwardly extending arm $d$ attached to a block $d'$ of insulating material and connected to a ground wire $d^2$, and a stylus or contact wire $d^3$ connected to the line L. Preferably we employ an iron wire of small gage which may be coiled as indicated and adjusted as needed to make contact with the tape.

The tape is drawn from the reel past the wetting wheel and between the contacts of the recording devices by means of rollers E which are preferably made of hard rubber covered with softer rubber $e$. As the tape is drawn forward by the feed rollers it is brought into contact with the wetting wheel and serves to revolve said wheel.

The contact plate D is provided with a plate $x$ of hard metal such as platinum to resist the disintegration ordinarily produced by the passage of the current and said plate D is formed with shoulders $d^x$ between which the tape is guided. A cover $d^4$ serves to hold the tape on the plate and this cover is hinged at $d^5$ and locked at $d^6$. The cover may be easily swung out of place to adjust the tape but when locked serves to hold the tape in position close to the contacts.

The tape is normally held away from the wetting wheel by a guide F comprising an arm $f$ secured or pivoted at $f'$ and held away from the wetting wheel by an adjustable spring $f^2$. The end of the guide next the wheel is of the form shown in cross section in Fig. 7. The arrangement is such that when the feed rollers are at rest, i. e., not moving the tape past the wetting wheel and the recording devices, the tape will be held out of contact with the wheel, as shown in Fig. 6, but as soon as the feed of the tape commences the guide yields and the tape makes contact with the wetting wheel, in the manner indicated in Fig. 1. This device is of importance because if the tape were in constant contact with the wheel it would be improperly moistened.

In order to regulate the area of tape contacting with the wetting wheel, we employ a guide H comprising a wheel $h$, supported on a frame $h'$, carrying an adjusting screw $h^2$, extending through a slot $h^3$ in a support $h^4$. It is obvious that by raising and lowering the guide wheel the length of tape held against the wheel may be adjusted or regulated to any necessary extent.

I indicates another guide wheel mounted to turn about a stationary axis over which the tape passes after leaving the wetting wheel.

It will be observed that the width of the absorbent ring $b^4$ is considerably less than that of the tape and that the solution is applied by the wheel to the middle portion only of the under side of the tape, which latter is made of absorbent paper of such grade or quality that the solution filters through to its upper side where the record is made and is also absorbed laterally by the marginal portions of the tape. In this way any foreign matter which is present in the solution and carried by the wheel is left on the under side of the tape where no record is made and surplus moisture is distributed or withdrawn from the middle portion of the tape where the record is applied.

Experience has demonstrated that if the record-receiving portion of the tape is too wet the record is blurred or if too dry the record is also imperfect. By thus absorbing a portion of the solution or taking it away from that portion of the tape which receives the record, a perfect record may be obtained.

We have furthermore found that the degree of moisture in the tape applied by the wetting wheel and which arrives at the recording devices is greatly influenced by climatic conditions and we have found that this may be remedied by providing devices for changing the length of tape between the wetting wheel and the recording devices. To do this we preferably employ a guide roller M, carried by a frame $m$, provided with an adjusting screw $m'$, extending into a slot $m^2$ in a support $m^3$. By these devices that portion of the tape between the wetting wheel and the recording devices may be so lengthened or shortened as to allow the solution applied to the tape to be so absorbed or distributed as to properly prepare it to receive the desired record.

Any suitable chemical solution may be employed for treating the tape; preferably we employ a solution consisting of ferro-cyanid of potassium, sal-ammoniac and water, sal-ammoniac being mainly employed to increase the conductivity of the tape, while the ferro-cyanid acts upon the metal deposited from the wire on the tape to produce the marks or characters of the record. It will be understood that the electric current passes from line through the stylus to the plate D and thence to ground or return circuit and, as is well known, current passing from the wire to the tape causes metal to unite with the solution to make the marks thereon.

It will be observed that the adjustable roller M not only controls the length of tape between the wetting wheel and the recording devices but also controls the time elapsing between the wetting of the tape and the placing of the record thereon and this element of time also controls the degree of moisture in the record-receiving portion of the tape when it arrives at the point where the record is applied.

As before stated it is of great importance that not only should the record-receiving portion of the tape be moistened to a proper extent, neither too dry nor too wet, in order that characters may be clearly and sharply made thereon, but no foreign matter should be present on the upper side of the tape because if chemical crystals or particles of foreign matter were present the contact through which the current passes from line might be raised from engagement with the tape momentarily and thus a dash might be converted into two dots and other irregular or unintentional characters might be made which would destroy accuracy of transmission.

In Fig. 8 we have shown how a plurality of wetting wheels may be made to operate on the tape for the purpose of insuring the proper saturation of the tape. Many of the parts of the apparatus are similar to those before described and are similarly lettered.

The tape X passes from the reel A under a guide roller H, over wetting wheels $b^2$, $b^2$, through spring-actuated guides F, and under a roller M, to the feed rolls E and past the recording devices C. These parts operate in the manner before described.

Experience has demonstrated that owing to the character of the paper tape employed it is sometimes desirable to provide means for insuring a thorough saturation of the tape before it reaches the recording devices. Owing to air cells in the tape and to the glossy finish given to it, and owing to the speed at which the tape passes the wetting devices, it sometimes happens that insufficient solution is transmitted to the recording surface of the tape. We have overcome this difficulty entirely by employing a plurality of wetting wheels; generally two such wheels are sufficient, as illustrated in Fig. 8. We also find that it is desirable to increase or decrease the length of tape between the wetting wheels in order to give sufficient time for the solution received from the first wheel to filter through the tape and so moisten it that it will be in the best condition to receive a final application of solution. In order to thus lengthen and shorten the tape between the wheels any suitable mechanism may be employed. A very simple device N for this purpose is illustrated in the drawings. This device comprises guide wheels $n$, $n'$ carried by a vertically arranged rod or support $n^2$ which is guided, as indicated, at $n^6$. This rod is pivotally connected at $n^4$ to a hand lever $n^3$, pivoted at $n^5$. The pivotal support at $n^5$ should have sufficient friction to cause the parts to remain in their adjusted position, or any other suitable device may be employed to so retain the guide in the position to which it is adjusted.

Fig. 8 of the drawings shows the tape slightly depressed between the two wetting wheels. If it is found that an insufficient amount of solution has been applied to the tape the rollers $n$, $n'$ may be lowered, thus increasing the length of the tape between the wheels and giving more time for the solution applied by the first wheel in the series to be absorbed by the tape before the latter reaches the last wheel in the series. The area of tape contacting with the first wheel in the series may be regulated by the device H, in the manner before described and by suitably regulating the device M, of the kind hereinbefore specified, the length of tape between the solution-applying devices and the recording devices may be lengthened or shortened for purposes hereinbefore explained.

The devices F operate in the same manner as the corresponding devices shown in Figs. 1 and 6 of the drawings; that is to say, when the tape is being drawn through the apparatus it will be held in contact with the wetting wheels, but as soon as the tape is released by the tape-feeding devices the spring-actuated devices will rise, in the manner indicated in Fig. 9 and hold the tape away from the wetting wheels.

Fig. 9 illustrates how the tape is disposed between the first wetting wheel and the guide N when the feed devices are at rest.

Our improved apparatus is the result of large experience and close study, has proved most efficient in practice, and is readily installed and employed in connection with automatic or other transmitting devices of well known construction.

In our application for patent, Serial No. 204,680, filed November 30, 1917, we have shown apparatus somewhat similar to that herein shown and described, and in that application we have made claims to the details of construction of the wetting wheel therein shown and described while the claims herein made relate to the organization of the apparatus aside from the details of construction of the wetting wheel.

We claim as our invention:

1. In chemical telegraphy means for advancing an absorbent record tape, means for applying a chemical solution to the middle portion only of the under side of the tape while being advanced, a ground contact over which the treated tape passes, and a contact connected to line which bears on the upper side of the tape and through which an electric current passes to the tape and thence to ground whereby metal is transmitted from said contact to the tape to produce telegraphic characters thereon.

2. In chemical telegraphy means for advancing an absorbent record-receiving tape, means for applying a chemical solution to the middle portion only of the under side of the tape while being advanced, a ground contact over which the treated tape passes, and a contact bearing on the upper side of the tape connected to line through which an electric current passes whereby metal is transmitted from the contact to the upper side of the tape to produce telegraphic characters thereon.

3. In chemical telegraphy means for advancing a record tape, means for wetting the under side of the tape while being advanced, devices for producing a record on the upper side of the tape, and means for automatically suspending the wetting operation when the advance movement of the tape ceases.

4. In chemical telegraphy means for advancing a record tape, devices for producing a record on the upper side of the tape, and means for applying a chemical solution to varying areas of the under side of the tape without varying the speed thereof while being advanced.

5. In chemical telegraphy means for advancing a record tape, a container for a chemical solution, a wetting wheel extending into the container and applying solution to the under side of the tape while being advanced, devices for producing a record on the upper side of the tape, a guide adjacent the wetting wheel through which the tape passes, and devices for automatically withdrawing the tape from the wheel when the advance movement of the tape ceases.

6. In chemical telegraphy means for advancing a record tape, a container for a chemical solution, a wetting wheel extending into the container and applying solution to the under side of the tape while being advanced, devices for producing a record on the upper side of the tape, a guide adjacent the wetting wheel through which the tape passes, devices for automatically withdrawing the tape from the wheel when the advance movement of the tape ceases, another guide for the tape, and devices for adjusting said guide to hold varying areas of the tape in contact with the wetting wheel.

7. In chemical telegraphy means for advancing a record tape, means for wetting the under side of the tape while being advanced, devices for producing a record on the upper side of the tape, and means for increasing and decreasing the length of the tape between the wetting wheel and the recording devices.

8. In chemical telegraphy means for advancing a record tape, means for wetting the under side of the tape while being advanced, devices for producing a record on the upper side of the tape, means for automatically suspending the wetting operation when the advance movement of the tape ceases, and means for increasing and decreasing the length of tape between the wetting means and the recording devices.

9. In chemical telegraphy, means for advancing an absorbent tape, recording devices past which the tape is fed, and means for applying a chemical solution to the tape comprising a container for the solution, a device for giving to the tape a preliminary application of the solution and another device suitably spaced from that first mentioned to give to the tape a final application of the solution.

10. In chemical telegraphy, means for advancing an absorbent tape, recording devices past which the tape is fed, and means for applying a chemical solution to the under side of the tape comprising a container for the solution, a device for giving to the under side of the tape a preliminary application of the solution, and another device suitably spaced from that first mentioned for giving to the under side of the tape a final application of the solution.

11. In chemical telegraphy, means for advancing an absorbent tape, recording devices past which the tape is fed, and means for applying a chemical solution to the tape comprising a container for the solution, a device for giving to the tape a preliminary application of the solution, another device suitably spaced from that first mentioned to give to the tape a final application of the solution, and means interposed between the solution-applying devices for increasing and decreasing the length of tape between said devices.

12. In chemical telegraphy, means for advancing an absorbent tape, recording devices past which the tape is fed, and means for applying a chemical solution to the tape comprising a container for the solution, a wheel operating in the solution to give a preliminary application of the solution to the tape, a second wheel suitably spaced from that first mentioned for giving to the tape a final application of the solution, means operating automatically to withdraw the tape from the solution when released by the tape-advancing devices, and manually operated means interposed between the two wetting wheels for increasing and decreasing the length of tape between the wetting wheels.

13. In chemical telegraphy means for moistening the middle portion only of the under side of a tape while being advanced, a circuit contact over which the moistened tape passes, and a circuit contact which bears on the opposite side of the middle portion only of the tape whereby current impulses pass through the tape and produce a record of telegraphic characters thereon.

14. In chemical telegraphy means for advancing an absorbent record tape, means for applying moisture to the under side only of the tape while being advanced, and circuit contacts bearing on the middle portion only of the tape through which the tape passes whereby current impulses pass through the tape and produce a record of telegraphic characters thereon.

15. In chemical telegraphy means for advancing an absorbent record tape, circuit contacts between which the tape passes, and means for applying moisture to the under side of the middle portion only of the tape while being advanced.

16. In chemical telegraphy means for advancing an absorbent record tape, recording devices past which the tape is fed, means for giving a preliminary moistening to the tape while being advanced, and means for applying a chemical solution to the moistened tape.

17. In chemical telegraphy means for advancing an absorbent tape, recording devices past which the tape is fed, means for giving a preliminary moistening to the middle portion only of the tape while being advanced, and means for applying a chemical solution to the moistened tape.

18. In chemical telegraphy, means for advancing an absorbent tape, recording devices past which the tape is fed, a container for a chemical solution, devices for giving to the tape a preliminary moistening, and devices suitably spaced from the first-mentioned devices to give to the tape an application of the chemical solution.

In testimony whereof we have hereunto subscribed our names.

PATRICK B. DELANY.
LOUIS W. SHUMAKER.